US012624233B2

(12) United States Patent
Lee et al.

(10) Patent No.: US 12,624,233 B2
(45) Date of Patent: May 12, 2026

(54) DNA BASED BIODEGRADABLE RESIN COMPOSITION

(71) Applicant: University of Seoul Industry Cooperation Foundation, Seoul (KR)

(72) Inventors: Jong Bum Lee, Seoul (KR); Hyunsu Jeon, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 749 days.

(21) Appl. No.: 18/072,900

(22) Filed: Dec. 1, 2022

(65) Prior Publication Data

US 2023/0167315 A1 Jun. 1, 2023

(30) Foreign Application Priority Data

Dec. 1, 2021 (KR) ........................ 10-2021-0169886

(51) Int. Cl.

| | |
|---|---|
| ***C09D 11/00*** | (2014.01) |
| ***B33Y 70/00*** | (2020.01) |
| ***C09D 11/03*** | (2014.01) |
| ***C09D 11/14*** | (2006.01) |
| ***C09D 105/00*** | (2006.01) |
| *C08K 5/3432* | (2006.01) |

(52) U.S. Cl.
CPC .............. *C09D 11/14* (2013.01); *B33Y 70/00* (2014.12); *C09D 11/03* (2013.01); *C09D 105/00* (2013.01); *C08K 5/3432* (2013.01)

(58) Field of Classification Search
CPC ...... C09D 11/14; C09D 11/03; C09D 105/00; B33Y 70/00; C08K 5/3432
USPC ........................................... 106/31.01, 31.13
See application file for complete search history.

(56) References Cited

U.S. PATENT DOCUMENTS 5,824,477 A * 10/1998 Stanley .................. C12N 15/10 435/6.12
2010/0189794 A1 7/2010 Luo et al.
2013/0157261 A1* 6/2013 Sharpe ............... G01N 21/6458 435/7.1
2016/0326576 A1 11/2016 Cook et al.
2021/0355246 A1 11/2021 Luo et al.

FOREIGN PATENT DOCUMENTS

CA 2510128 C * 2/2014 ................ A61P 9/04
KR 101132382 B1 4/2012

OTHER PUBLICATIONS

Office Action issued for KR patent application Serial No. 10-2021-0169886, dated Aug. 18, 2023, with English machine translation.

* cited by examiner

*Primary Examiner* — James E Mcdonough
(74) *Attorney, Agent, or Firm* — Westman, Champlin & Koehler, P.A.; Amanda M. Prose

(57) ABSTRACT

The present disclosure relates to a DNA-based biodegradable resin composition. The DNA resin composition prepared by combining DNA as a polymer and Bipyridine-based compound as a flocculant has excellent physical properties and biodegradability, so it can be used as a bioplastic material.

3 Claims, 15 Drawing Sheets

$$\sigma = F/A$$
$$\varepsilon = (L_0+\Delta L)/L_0$$

DNA BASED BIODEGRADABLE RESIN COMPOSITION

TECHNICAL FIELD

The present disclosure claims the benefit of the filing date of Korean Patent Application No. 10-2021-0169886 submitted to the Korean Patent Office on Dec. 1, 2021, and all of its contents are included in the present disclosure. The present disclosure relates to a DNA-based biodegradable resin composition. The DNA resin composition prepared by combining DNA as a polymer and bipyridine-based compounds as flocculants has excellent physical properties and biodegradability, so it can be used as a bioplastic material.

BACKGROUND

Plastics have excellent physical properties and processability and a low price, so they are used in various fields. However, conventional plastics do not decompose in the natural environment, and only 9% of all plastics are recycled, which is a problem for environmental pollution.

To solve this problem, biodegradable bioplastics are required to replace petroleum-based non-degradable plastics. Currently, commercialized biodegradable plastics include starch-based plastics, polylactic acid (PLA), polyhydroxyalkanoate (PHA), etc. However, starch-based plastics have a problem of environmental pollution and a decrease in food production due to the increase in the cultivation of corn and sugarcane, which are their raw materials, PLA has a problem of low biodegradability in the marine environment, and PHA is produced by microorganisms, so there is a problem that the production is not sufficient, and the price is high.

(Assignment Information)

The present disclosure was derived by carrying out the task of task number 2021-RMD-S04 of the Science and Technology Employment Promotion Agency, and the research task name Development of bioplastic materials for biodegradable polymer-based R&D (2021 Apr. 1~2023 Dec. 31)' of the research project name ‘Research Materials Development Diffusion Support Project’.

(Patent Document 1) Korea Public Publication No. 10-2010-0002564 (2010 Jan. 12)

SUMMARY

The present disclosure provides a DNA resin composition that raw materials can be obtained inexpensively with excellent physical properties and biodegradability.

According to embodiment of the present disclosure provides DNA as a polymer; and a DNA resin composition including a bipyridine-based compound as a flocculant, in which the DNA and the bipyridine-based compound are combined.

The average molecular weight of the DNA is not particularly limited, for example, 1000 to 2 million, 5000 to 2 million, 10,000 to 2 million, 100,000 to 2 million, 500,000 to 2 million, 1 million to 2 million, 1 million to 1.5 million, or about 1.3 million.

The average base pairs of the DNA are not particularly limited, for example, 100 to 3000 bp, 500 to 3000 bp, 1000 to 3000 bp, 100 to 2500 bp, 500 to 2500 bp, 1000 to 2500 bp, or about 2000 bp.

The bipyridine-based compound can bind (intercalate) to DNA, and when mixed with DNA and heated above the melting temperature (Tm) of DNA, DNA can be aggregated to form a resin composition in the form of a hydrogel. By separating and drying it, the resin composition of the present disclosure can be obtained.

According to one embodiment, the bipyridine-based compound may be represented by the following Chemical Formula 1.

[Chemical Formula 1]

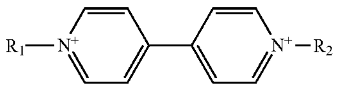

In Chemical Formula 1, R1 and R 2 may be straight or branched chain alkyl groups of C 2 to C 10, C 5 to C 9, or C 6 to C 8, respectively. If the carbon number of the substituent is less than or equal to the range, the alkyl group length may be short and aggregation may not occur smoothly, and if the carbon number of the substituent is greater than the range, the length of the alkyl group may be excessively long and the acceptance degree is low, and it may be difficult to react with DNA.

The bipyridine-based compound may be N,N'-alkyl-4,4'-bipyridine-based compound or viologen. The N,N'-alkyl-4,4'-bipyridine-based compound or viologen is, for example, dimethylviologen (N, N'-dimethyl-4,4'-bipyridinium dichloride), diethyl biologen (N,N'-diethyl-4,4'-bipyridinium dichloride), dipropyl biologen (N,N'-dipropyl-4,4'-bipyridinium dichloride), dibutyl biogen (N,N'-dibutyl-4,4'-bipyridinium dichloride), dipentyl biologen (N,N'-dipentyl-4,4'-bipyridinium dichloride), dihexyl biogen (N,N'-dihexyl-4,4'-bipyridinium dichloride), diheptyl biogen (N,N'-diheptyl-4,4'-bipyridinium dichloride, DHV), or dibenzyl biogen (N,N'-dibenzyl-4,4'-bipyridinium dichloride, DBV).

As the DNA resin composition is dried, the moisture content may be 10% or less, 5% by weight or less, 3% by weight or less, 2% by weight or less, or 1% by weight or less.

The drying of the DNA resin composition results in a moisture content of 0.1 to 5% by weight, 0.1 to 4% by weight, 0.1 to 3% by weight, 0.2 to 5% by weight, 0.2 to 4% by weight, 0.2 to 3% by weight, 0.3 to 5% by weight, 0.3 to 4% by weight, 0.3 to 3% by weight, 0.5 to 5% by weight, 0.5 to 4% by weight, 0.5 to 3% by weight, 0.7 to 5% by weight, It may be 0.7 to 4% by weight, 0.7 to 3% by weight, 1.0 to 5% by weight, 1.0 to 4% by weight, or 1.0 to 3% by weight.

According to one embodiment, the molar ratio of the base pair of the DNA and the bipyridine-based compound may be 1~3:1.5~3, or 1:1. The number of moles of the DNA may be based on base pairs.

The DNA resin composition may be biodegradable and can be used as a biodegradable bioplastic.

Another aspect provides a bioink composition for 3D printing including DNA and bipyridine-based compounds.

According to one embodiment, the bioink composition forms a gel when it is loaded into a 3D printer and heated, and is smoothly discharged through a nozzle and laminated, and when cooled and dried, the strength of the structure made of the DNA resin composition increased, and it was confirmed to have physical properties suitable for 3D printing.

The DNA of the bioink composition, the bipyridine-based compounds, and the molar ratios thereof are the same as described above.

The solvent of the bioink may be distilled water, PBS, or a cell culture medium.

The bioink may further include other types of polymer compounds known in the art to which the present disclosure pertains, and it may be one or more polymer compounds, copolymers thereof, or mixtures thereof selected from the group consisting of, for example, polyethylene glycol (PEG), neophenyl glycol diacrylate (NPGDA), polyethylene oxide (PEO), polyacrylamide (PAAm), polyhydroxyethyl methacrylate (PHEMA), hyrunonic acid methacrylate (HAMA), polyacrylic acid (PAA), polyvinyl alcohol (PVA), poly (N-isopropylacrylamide) (PNIPAM), polyvinylpyrrolidone (PVP), polylactic acid (PLA), polyglycolic acid (PGA) and polycaprolactone (PCL), gelatin, gelatin methacryloyl (GelMA, Gelatin methacryloyl), alginate, carrageenan, chitosan, hydroxyalkyl cellulose, alkyl cellulose, silicon, rubber, aga, carboxyvinyl copolymer, polydioxolane, polyacrylacetate, polyvinyl chloride, and anhydrous maleic acid/vinyl ether.

The bioink composition may further include a photoinitiator, a preworking agent, a crosslinking agent, or a mixed composition thereof. The photoinitiator and the initiator may be selected from a material known in the art, for example, eosin (eosin Y or Eoin B), N-phenylglycine, N, N-dialkylaniline compound, tertiary amine compounds, organoborate salts, N-vinylpyrrolidone. The crosslinking agent may be selected from a material known in the art, for example, calcium chloride ($CaCl_2$), $MgCl_2$ and $AlCl_3$.

Another aspect provides a method for producing a DNA resin composition including: preparing a solution in which DNA and a bipyridine-based compound are mixed; heating the solution above the denaturation temperature of DNA to produce a shrunken DNA hydrogel; separating the DNA hydrogel from the heated solution; and drying the separated DNA hydrogel.

The denaturation temperature may vary depending on the length and sequence of the DNA, and the denaturation temperature can be appropriately set by grasping it according to a method known in the art to which the present invention belongs. The denaturation temperature may be, for example, at least 55° C., at least 60° C., at least 65° C., at least 70° C., at least 75° C., at least 80° C., at least 85° C., or at least 90° C., but is not particularly limited.

According to one embodiment, a precursor aqueous solution containing DNA and diheptyl biogen is heated above the melting temperature of DNA to form a shrunken DNA hydrogel, and the DNA resin composition is prepared by separating and drying it without cooling.

According to one embodiment, the step of separating the DNA hydrogel may be to separate the DNA hydrogel from a heated solution of 70 to 100° C., 80 to 100° C., 70 to 90° C., or 80 to 90° C.

According to one embodiment, the isolated DNA hydrogel may be separated from a heated solution at least 60° C., at least 65° C., at least 70° C., at least 75° C., at least 80° C., at least 85° C., or at least 90° C. Specifically, the manufacturing method may be to separate and dry the DNA hydrogel shrunk in the solvent at a high temperature without cooling. When the shrunken DNA hydrogel in solution is cooled while immersed in solution, the shrunken DNA hydrogel absorbs water and swells or expands again, so it may be efficient to separate and dry at high temperature.

The DNA-based resin composition according to one embodiment may have properties comparable to petroleum-based plastics and can be quickly degraded in the natural environment, so it can be used as a biodegradable bioplastic material.

The DNA-based resin composition according to one embodiment may be used for injection molding, thin film manufacturing, and coating.

The DNA-based bioink composition according to one embodiment can be used as a 3D printing ink.

BRIEF DESCRIPTION OF THE DRAWINGS

In FIG. 17A, $L_0$ is the length of the dogbone specimen before the pulling force is applied, and $L_0+\Delta L$ is the length of the dogbone specimen after the pulling force is applied.

DETAILED DESCRIPTION

Hereinafter, one or more embodiments will be described in more detail through examples. However, these embodiments are intended to illustrate one or more embodiments illustratively, and the scope of the present disclosure is not limited to these embodiments.

Example 1: DNA Resin Composition Preparation 1-1. Preparation of Aqueous Solution of Bulbs Mixed with DNA and Flocculant DNA (Deoxyribonucleic acid sodium salt from salmon testes (D1626), Sigma Aldrich) and Diheptyl viologen dichloride (DHV) were prepared. According to the manufacturer information of the DNA, the average base pair of the DNA is about 2,000 base pairs, and the average molecular weight is 1.3 million.

An aqueous solution of 12.5 mM of DNA and 25 mM of DHV (Diheptyl Viologen) was prepared. The molar concentration of DNA is calculated by calculating the base pairs of double-stranded DNA into one molecule, and for each base of DNA, it was mixed with the same molar concentration as DHV. When the molar concentration of DNA is based on the base pair, the mole ratio of DNA and DHV is 1:2, and when the molar concentration of DNA is based on the base, the mole ratio of DNA and DHV is 1:1.

1-2. Bulb Aqueous Solution Heating and DNA Slurry Formation

Figure 1:
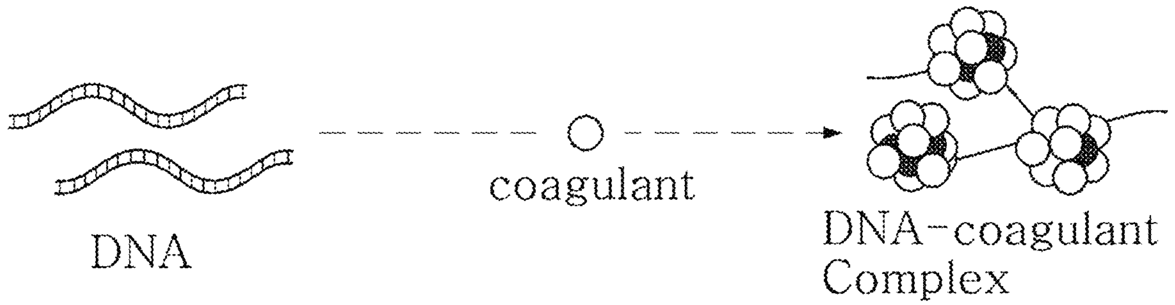
FIG. 1 is a schematic diagram illustrating a process in which DNA and flocculant are combined to produce a DNA resin composition.
Figure 2:
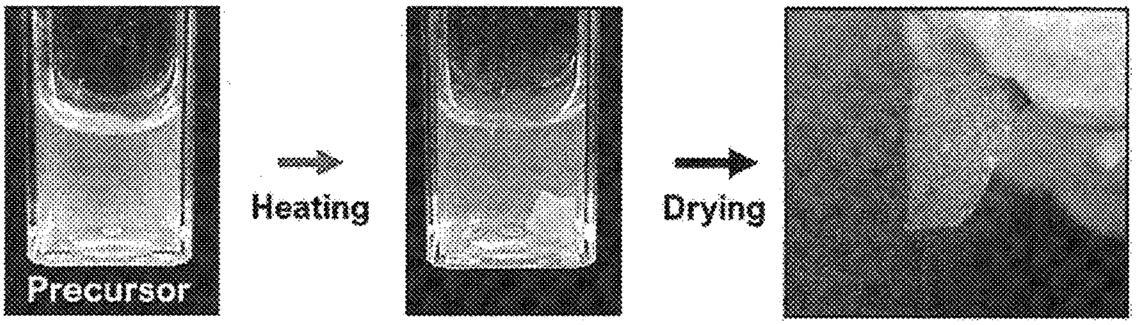
FIG. 2 shows a process of preparing a shrunk DNA hydrogel by heating an aqueous solution mixed with DNA and DHV and drying it to produce a DNA-based plastic.

The DNA/DHV bulb aqueous solution was heated in a reactor to 90° C. for 25 minutes. According to FIG. 2, the bulb aqueous solution gradually became transparent after 6 minutes of heating, and after 6 minutes (about 60° C.), DNA and DHV were coagulated to form a solid resin composition separated from the aqueous solution phase. As the temperature increased, the resin composition of the solid phase contracted, forming a dehydrated DNA/DHV resin composition completely separated from the aqueous solution phase. The DNA resin composition was separated in a solution at a high temperature (90° C.) and dried naturally at room temperature for 24 hours.

SEM photo analysis of the dried DNA resin composition was performed. SEM analysis was performed using Hitachi's SU-8010 instrument and was taken under a voltage of 1.0 kV.

Figure 3:
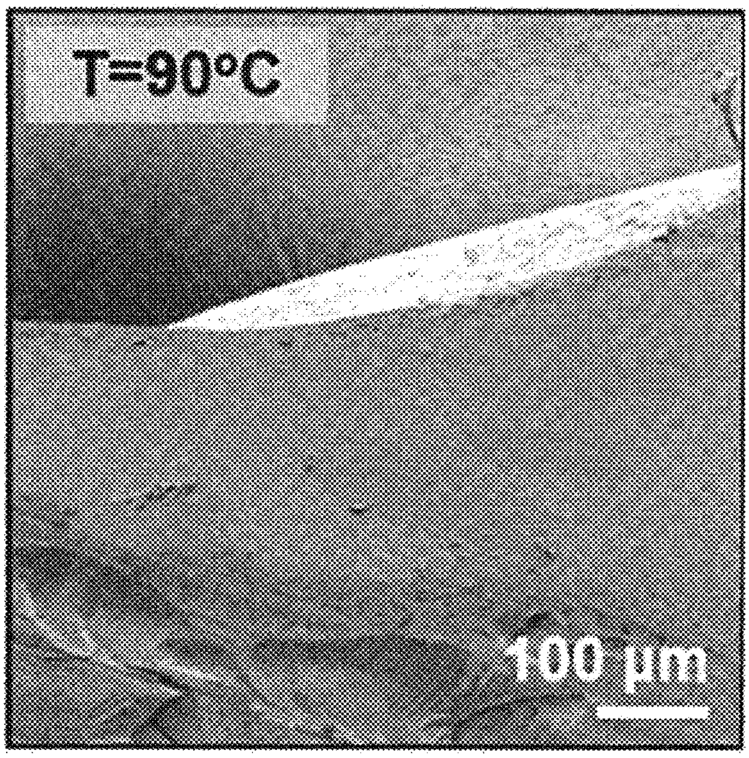
FIG. 3 shows an SEM picture of a DNA resin composition prepared according to an embodiment. T=90° C. means that the DNA resin composition is separated in a solution at a temperature of 90° C.

According to the SEM photo analysis of FIG. 3, the dried DNA resin composition had a very dense structure on the surface and cutting surface. This indicates that DNA and DHV bind strongly and stably.

The moisture content of the dried DNA resin composition was measured and found to be about 1 to 5% by weight. However, the moisture content may vary depending on the drying method and time.

Example 2: Identification of DNA Resin Composition Formation Principle

In order to identify the cause of the DNA and DHV mixed solution causing phase change during heating, an aqueous DHV solution was added to an aqueous DNA solution at 25° C. or an aqueous DNA solution at 90° C., and the phase change was visually confirmed.

Figure 4A:
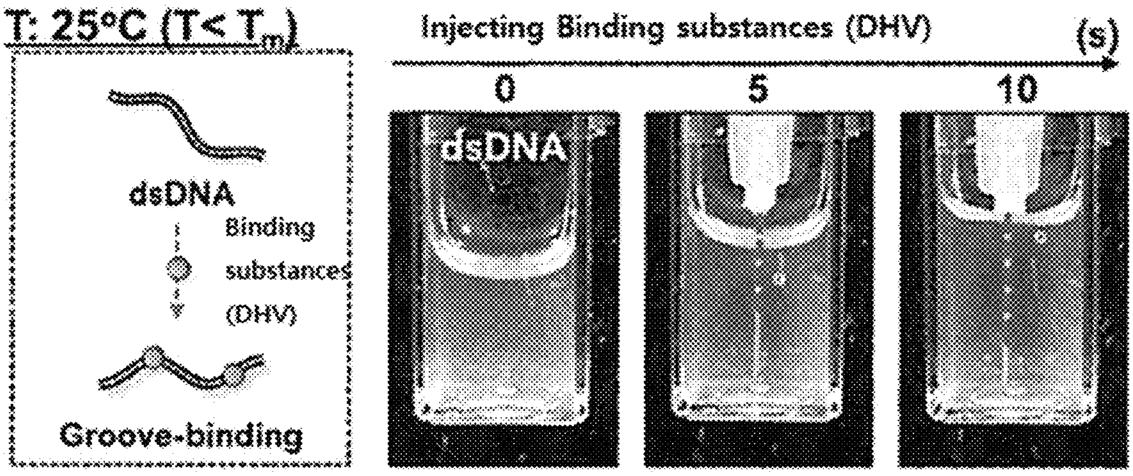
FIG. 4A is a result of adding an aqueous DHV solution to an aqueous dsDNA solution at 25° C.
Figure 4B:
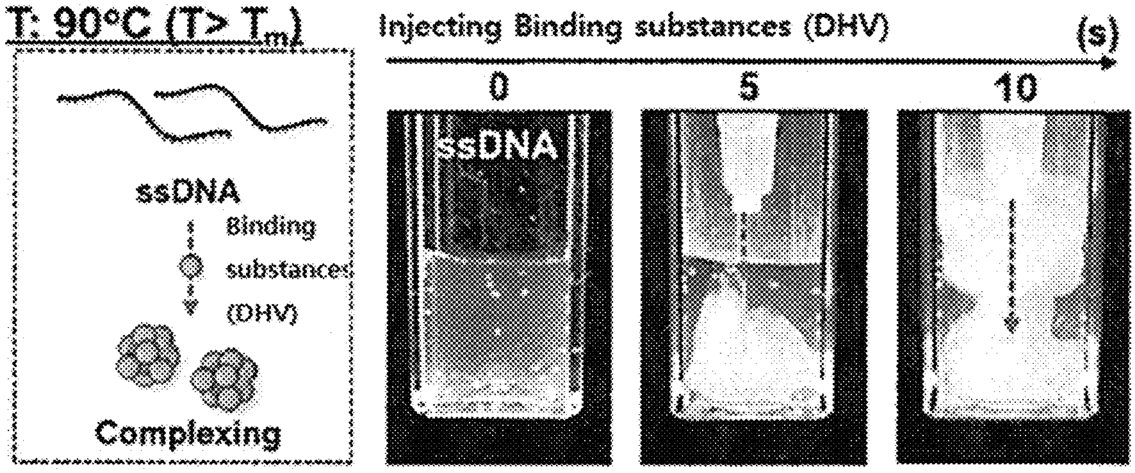
FIG. 4B is a result of adding an aqueous DHV solution to an aqueous solution of ssDNA at 90° C. and observing the change to a solid phase.

According to FIG. 4A and FIG. 4B, when an aqueous DHV solution was added to an aqueous DNA solution at room temperature (25° C.), no formation of a DNA resin composition was observed, and DNA and DHV were found to remain separated without binding to each other in the aqueous solution. However, when an aqueous solution of DHV was added to an aqueous DNA solution heated to 90° C., an opaque solid slurry was immediately formed at the contact of the two aqueous solutions.

According to the experimental results, when DHV encounters dsDNA, DHV can bind to a part of the groove of DNA, but no binding occurs to the extent that slurry is formed, and when DHV contacts ssDNA heated to a temperature above Tm and separated into single strands (denature), it strongly binds and agglomerates, thereby forming a DNA resin composition in the form of a slurry.

AFM imaging was performed on a mixed solution of dsDNA and DHV to confirm the bond form between DNA and DHV. AFM analysis was performed using Park NX10 equipment from Park Systems and used a non-contact imaging method using NC-NCH tips.

Figure 5A:
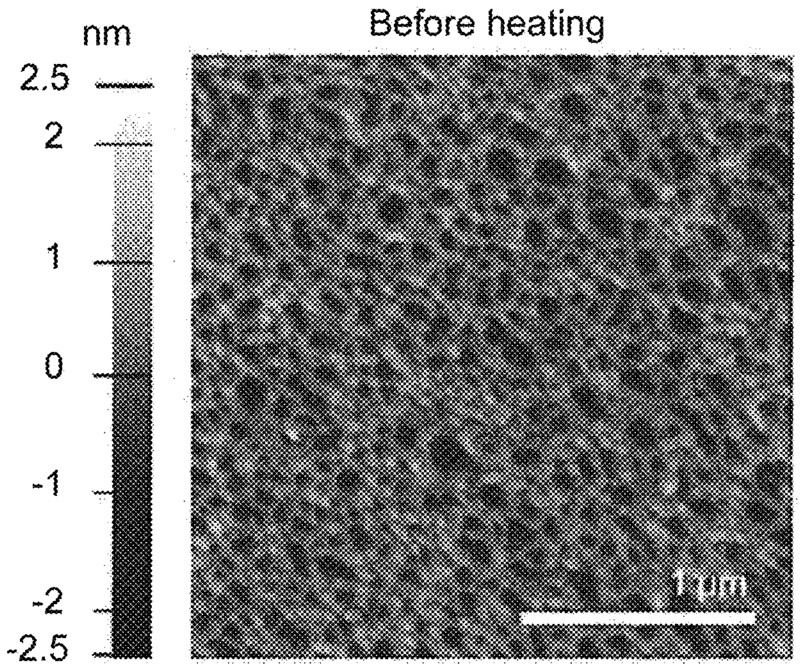
FIG. 5A is a result of observation by AFM (Atomic Force Microscopy) before heating and FIG. 5B is a result of observation by AFM (Atomic Force Microscopy) after heating of an aqueous solution mixed with dsDNA and DHV.
Figure 5B:
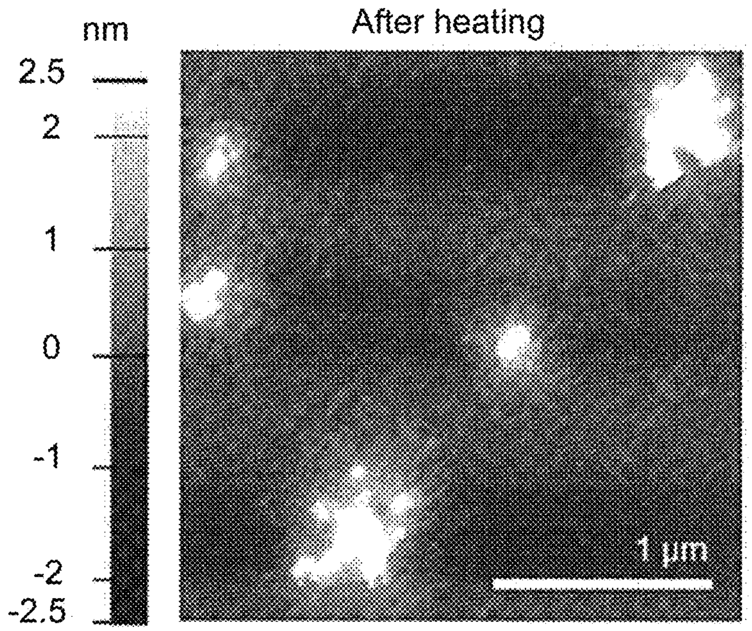

According to FIGS. 5A and 5B, in the aqueous solution (before heating) in which dsDNA and DHV were mixed at room temperature, the DNA chains were dispersed, and no aggregated structure could be found. However, in the aqueous solution mixed with dsDNA and DHV and heated to 90° C. (after heating), a number of structures in which DNA was aggregated were confirmed.

In order to clearly identify whether the cause of the binding of DNA and DHV at high temperatures is due to the denaturing of dsDNA to ssDNA, an aqueous solution of DHV was added to the aqueous solution of ssDNA and turbidity and optical density were measured.

Figure 6A:
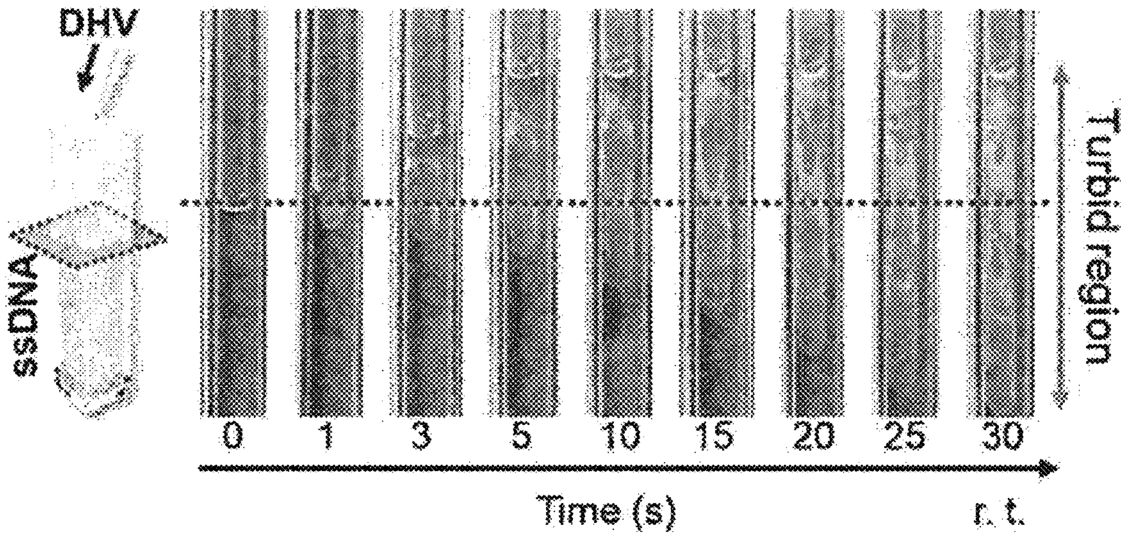
FIG. 6A shows the result of adding an aqueous DHV solution to an aqueous solution of ssDNA and visually observing the turbidity change of the mixed solution.
Figure 6B:
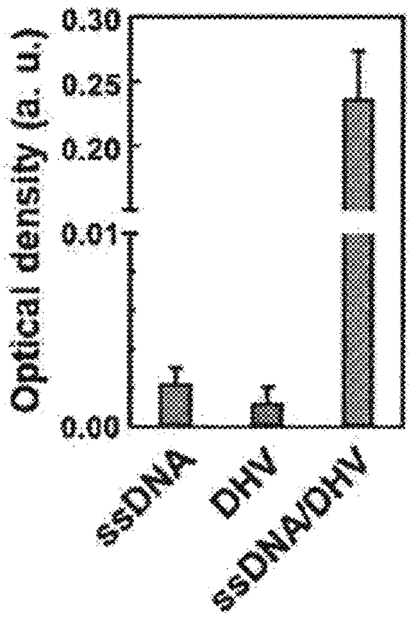
FIG. 6B is a result of confirming the optical density of the mixed solution in the 600 nm wavelength band.

According to FIG. 6A and FIG. 6B, the turbidity changes of the solution added to the aqueous solution of DHV to the aqueous solution of ssDNA was clearly confirmed with the naked eye. The optical density of the ssDNA/DHV mixed solution was more than 100 times higher than the optical density of the ssDNA aqueous solution or the optical density of the DHV aqueous solution.

AFM analysis was performed on an ssDNA solution and an ssDNA/DHV mixed solution.

Figure 7A:
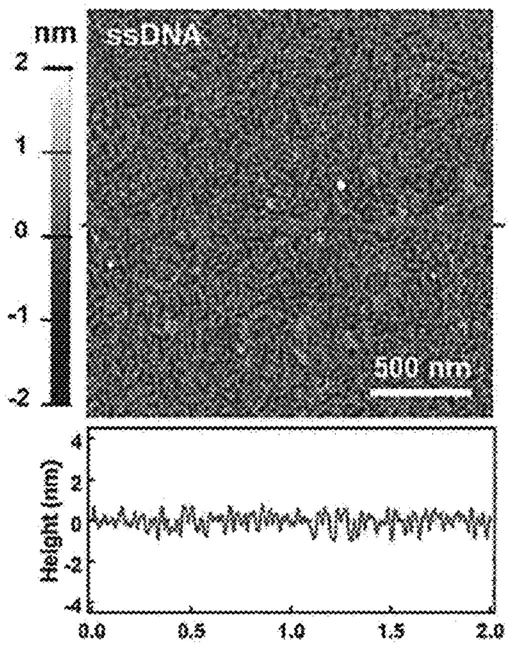
FIG. 7A shows AFM imaging results and height distribution of an aqueous ssDNA solution and FIG. 7B shows AFM imaging results and height distribution of a solution in which ssDNA and DHV are mixed.
Figure 7B:
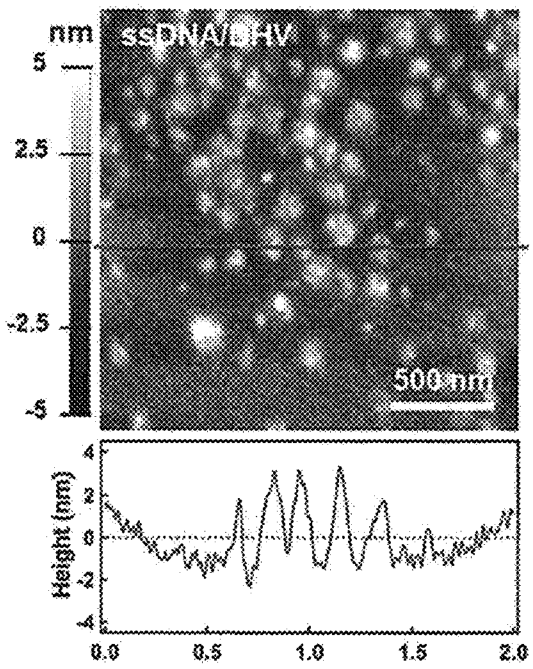

According to FIG. 7A and FIG. 7B, the aggregated form was not identified in the AFM picture of the ssDNA aqueous solution, and the height distribution was 1 to 2 nm high. However, AFM photographs of solution samples mixed with DHV aqueous solution added to ssDNA aqueous solution showed a large number of aggregated forms, and it was confirmed that the height distribution of the aggregated form was 5 to 10 nm.

ssDNA solutions and dsDNA solutions were prepared at various concentrations (0 mg/ml, 1.64 mg/ml, 3.27 mg/ml, 4.91 mg/ml, 6.54 mg/ml, 8.18 mg/ml, 9.81 mg/ml). The temperature of the dsDNA solution was adjusted to room temperature and was divided into a group to which the DHV aqueous solution was added and a group to which the DHV aqueous solution was not added. The temperature of the ssDNA solution was adjusted to 90° C., and the DHV aqueous solution was divided into the group to which the DHV aqueous solution was added and the group to which the DHV aqueous solution was not added. The turbidity and optical concentration of the experimental groups were confirmed.

Figure 8A:
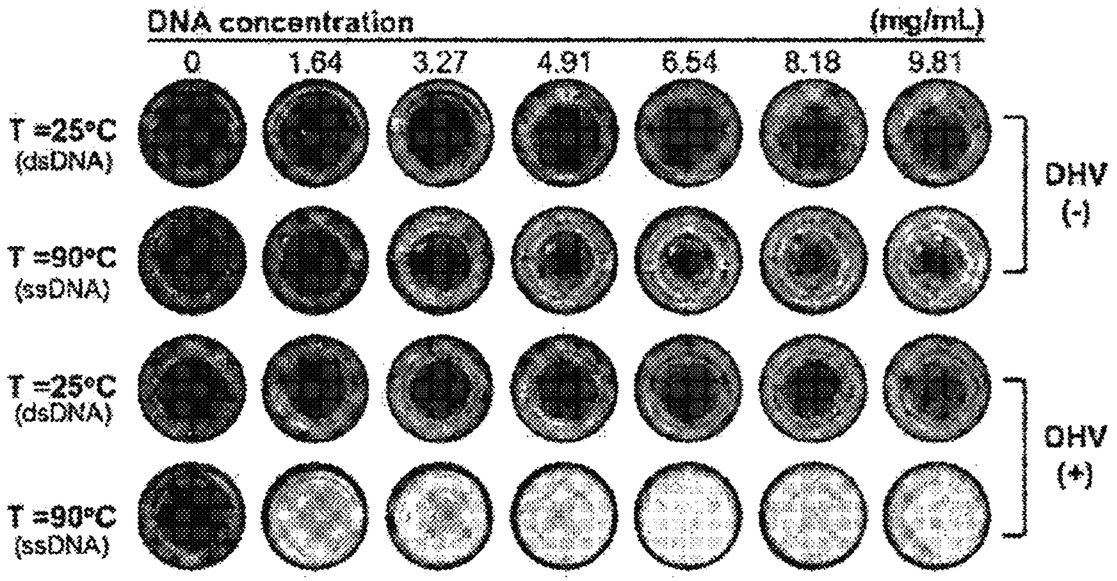
FIG. 8A shows the results of adding an aqueous DHV solution of dsDNA at 25° C. and an aqueous solution of ssDNA at 90° C. by concentration and visually observing the turbidity change thereof.
Figure 8B:
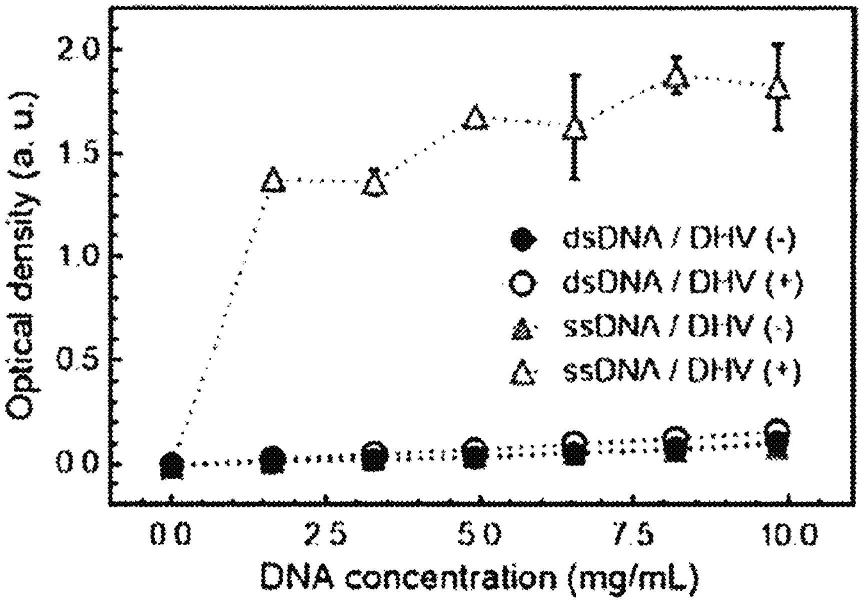
FIG. 8B shows the optical density of the mixed solution in the wavelength band of 600 nm.

According to FIG. 8A and FIG. 8B, aggregation occurs only in the experimental group in which ssDNA and DHV are mixed, and it was confirmed that aggregation does not occur even when the concentration of DNA increases in the experimental group in which dsDNA and DHV are mixed at room temperature.

Taken together, the results of the above experiments indicate that the bond with DHV occurs only when the double-stranded DNA denatures at high temperatures to become single-stranded DNA, and the bond between the single-stranded DNA and DHV is not due to a new chemical bond, but by an intermolecular force.

Example 3: Evaluation of Physical Properties of DNA Resin Composition

The physical property change that varies with temperature when separating the DNA resin composition from the aqueous solution was measured. The DNA resin composition was analyzed using the Mark-10 Force Gauge instrument. The DNA resin composition immediately after separation in a solution at 90° C. and the DNA resin composition cooled to 25° C. for 2 hours were prepared as samples, and tensile stress (σ) and tensile strain (ε) were measured under normal temperature conditions.

Figure 9:
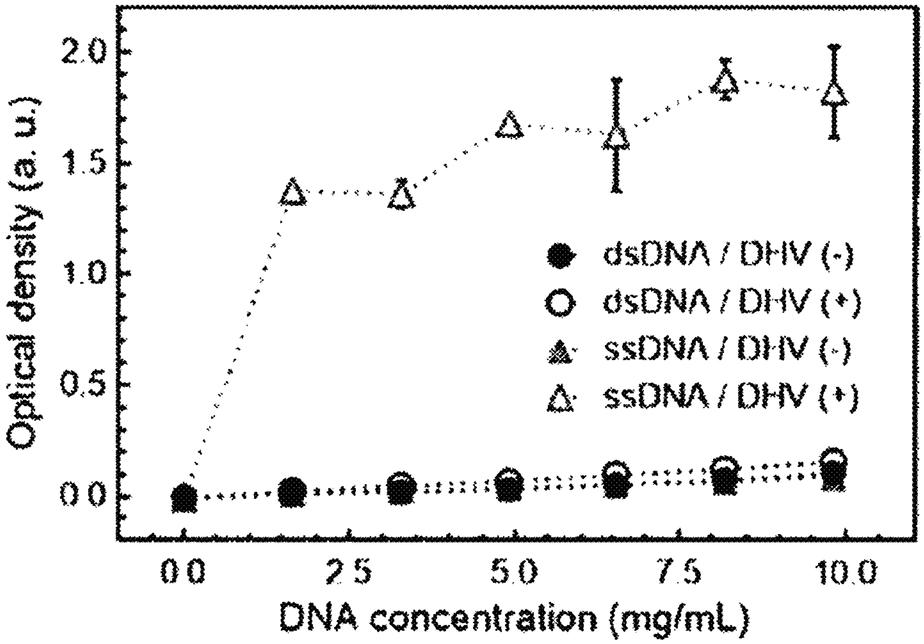
FIG. 9 shows a change in the physical properties of the DNA resin composition before and after drying.

According to the tensile stress and tensile strain measurement results of FIG. 9, the DNA resin maintained at a high temperature (before solidification) was found to have very high plasticity because its shape is greatly deformed even with a slight stress. However, the DNA resin that was fixed in shape (after solidification) after room temperature cooling showed very low strain even when the stress was increased, so the Young's modulus ($E=\sigma/\varepsilon$) was very high, and it was destroyed above a certain stress, showing obvious marginal strain, so it exhibited the same physical properties as hard solid plastics.

Force-distance measurements were performed using AFM equipment. Measurements were performed using Park Systems' NX-10 equipment and PPP-NCHR cantilevers. Using the standard force-distance measurement method, the cantilever was approached to the DNA resin composition before and after drying until a force of 1.5 μN was applied, and then allowed to fall off again.

Figure 10A:
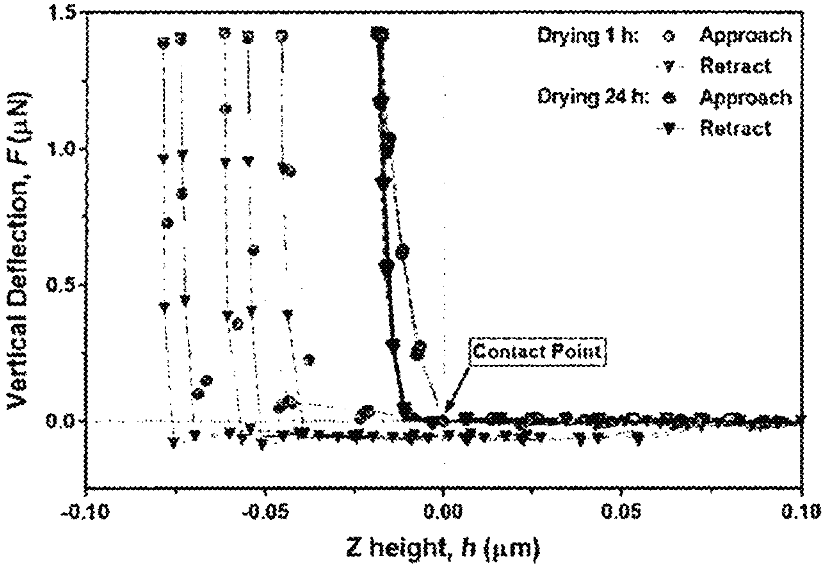
FIG. 10A and FIG. 10B show AFM force-distance analysis results before and after drying of the DNA resin composition.
Figure 10B:
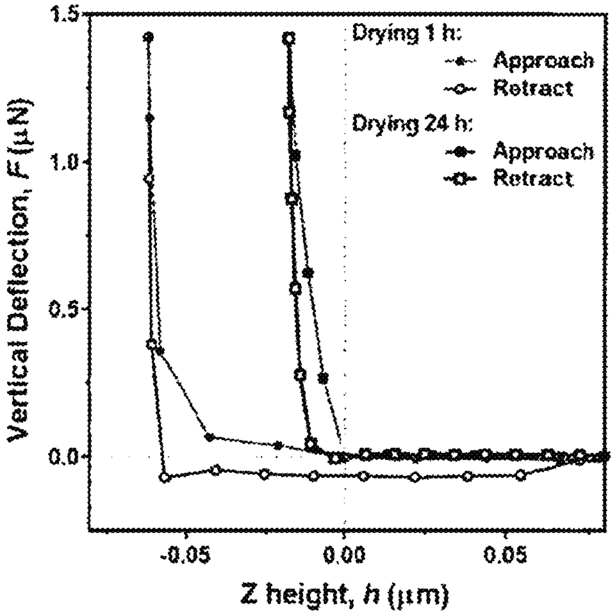

According to the AFM force-distance analysis results of FIG. 10A and FIG. 10B, the DNA resin dried for 1 hour was analyzed to have high strain and adhesion, but the DNA resin dried for 24 hours was found to have very high strength and no adhesion.

The plastic DNA resin composition could be molded into a thin film form through a thin spreading process before drying. The DNA resin thus molded was confirmed through AFM and confirmed to have a thickness of about 100-200 μm.

Figure 11:
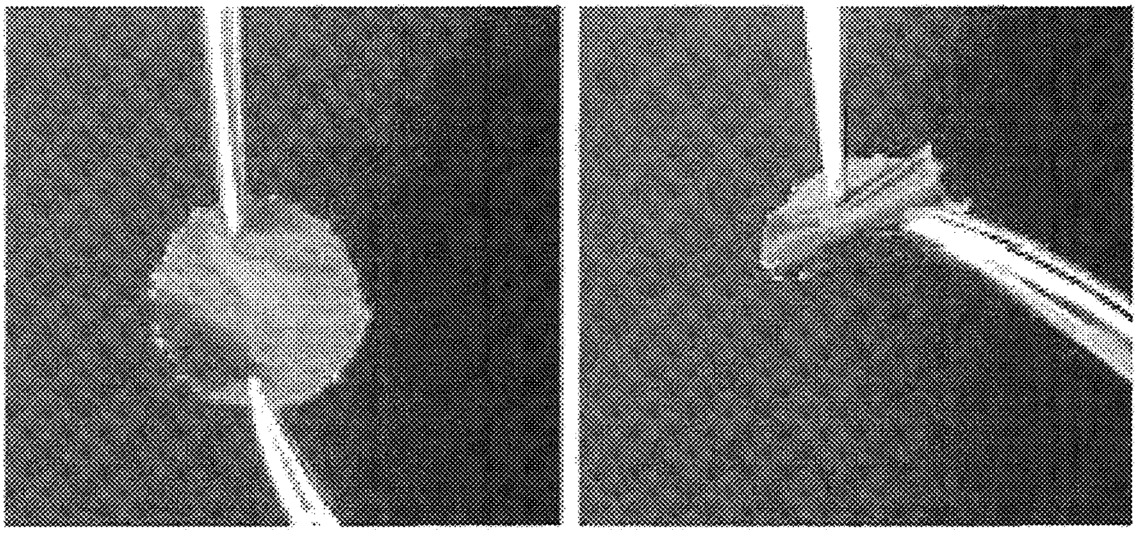
FIG. 11 shows a thin film prepared of a DNA resin composition.

According to FIG. 11, it was confirmed that the DNA resin molded in the form of a thin film is flexible.

Figure 12A:
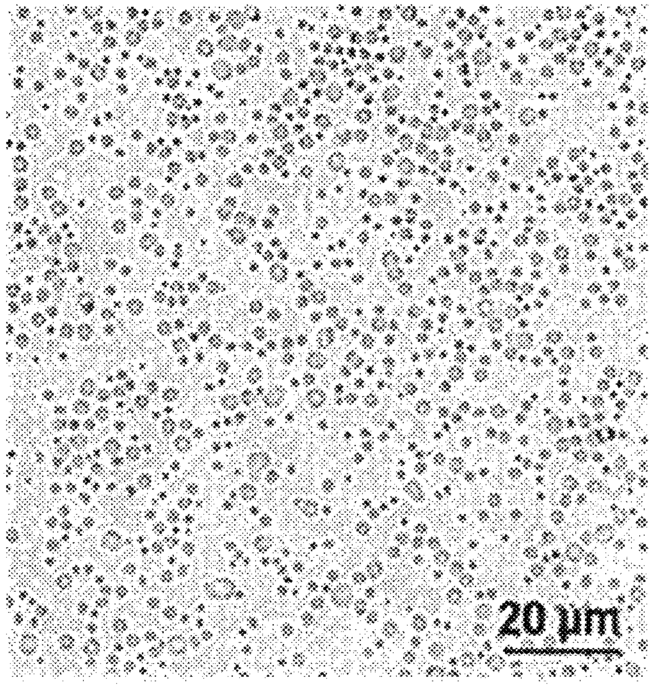
FIG. 12A shows DNA resin composition microparticles.
Figure 12B:
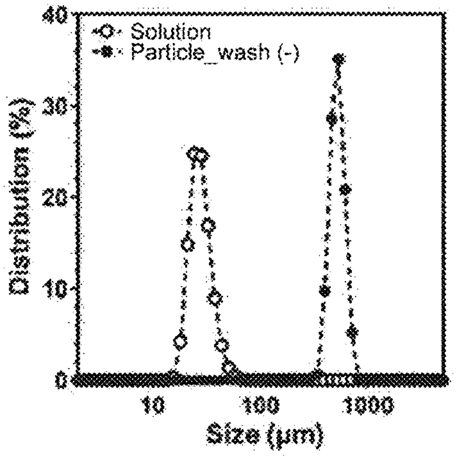
FIG. 12B shows their diameter and zeta potential.
Figure 12B:
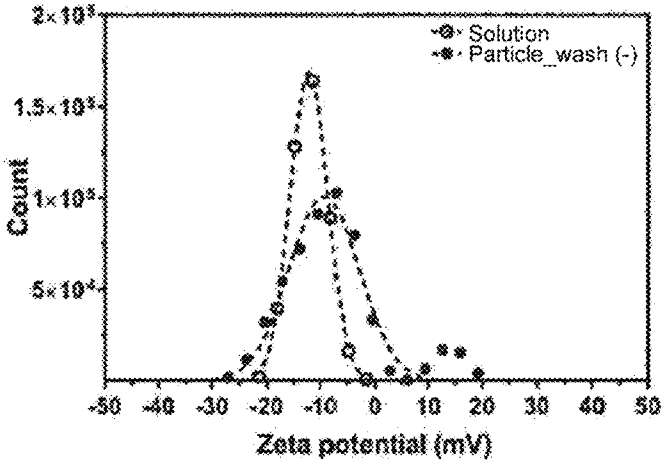

DNA resin microparticles were synthesized through the process of mixing an aqueous DNA solution and an aqueous DEV solution. The size and zeta potential of the synthesized DNA resin microparticles were measured using Malvern's Zetasizer nano instrument, and the DNA resin composition could be obtained by heating the synthesized DNA resin microparticles to According to FIG. 12A and FIG. 12B, it was confirmed that the DNA resin microparticles have a diameter of 1000 μm or less and a zeta potential of −10 mV on average, so they have excellent dispersion power.

Figure 13:
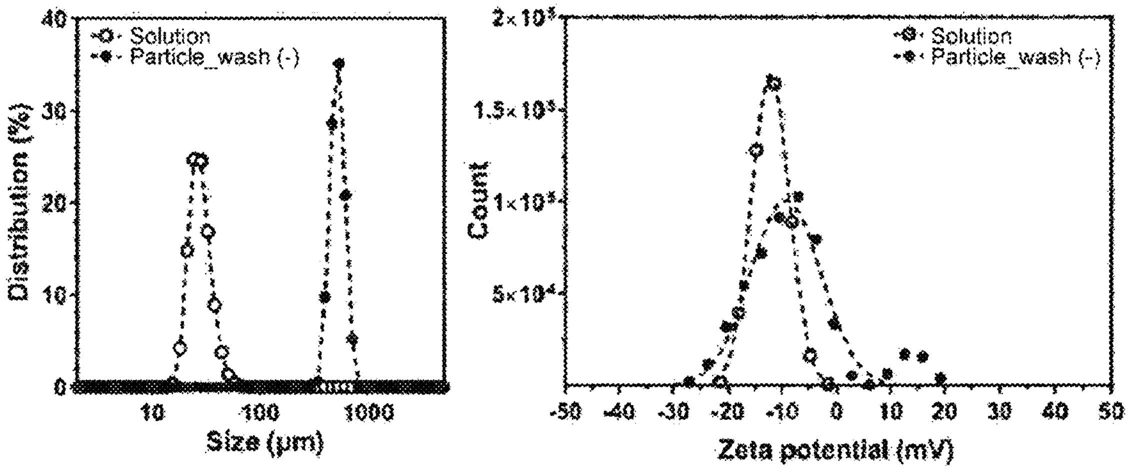
FIG. 13 shows a DNA resin composition synthesized by dispersing and heating a DNA resin composition in the form of microparticles in a Diethyl Viologen (DEV) solution.

According to FIG. 13, when DNA resin microparticles are dispersed in a DEV (Diethyl Viologen) solution and heated to 90° C., the DNA resin microparticles aggregate and precipitate.

Therefore, the DNA resin composition of the present invention can be molded into a two-dimensional form and can be used for preparing microparticles and coating on the surface of an object. For example, by applying a microgranularized DNA resin composition to the surface to be coated and heat treating it, it can be coated without performing an additional surface treatment process such as masking or etching.

Figure 14:
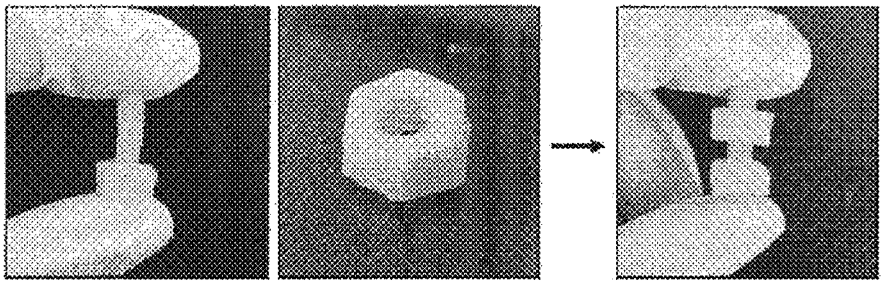
FIG. 14 shows bolts, nuts, and assembled forms produced by 3D printing DNA resin composition-based inks.
Figure 15:
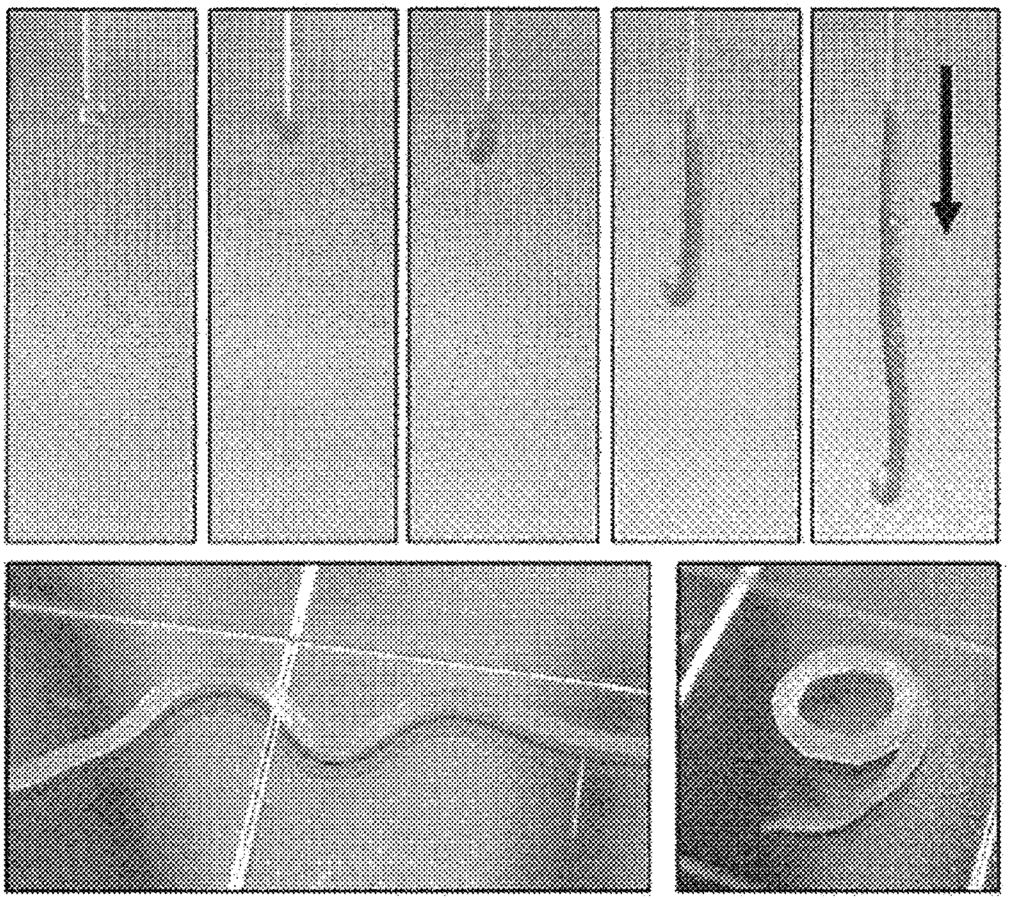
FIG. 15 shows a process in which a DNA resin composition-based ink is discharged from a 3D printing nozzle and a discharged form.

The DNA resin composition of the present invention can be used to produce a three-dimensional structure by 3D printing ink and 3D printing. According to FIG. 14, the DNA resin composition was produced in the form of bolts and nuts by injecting into the mold, and the dried bolts and nuts could be fastened. According to FIG. 15, the heated DNA resin composition was smoothly discharged through the nozzle. Through this, it was confirmed that the DNA resin composition of the present invention has physical properties suitable for ink for 3D printing.

As discussed above, the DNA resin composition has plasticity when the temperature is high, and the strength increases after the temperature decreases and dries, so it has beneficial properties for 3D printing. Specifically, since the mixed solution of DNA and DHV does not form a solid phase before heating, it can be made into ink and stored, and can be heated before 3D printing to prepare a gel-type ink. It is excellent and can be easily laminated, and since the physical properties of the laminated structure increase after drying, it can have characteristics advantageous to 3D printing.

Figure 16:
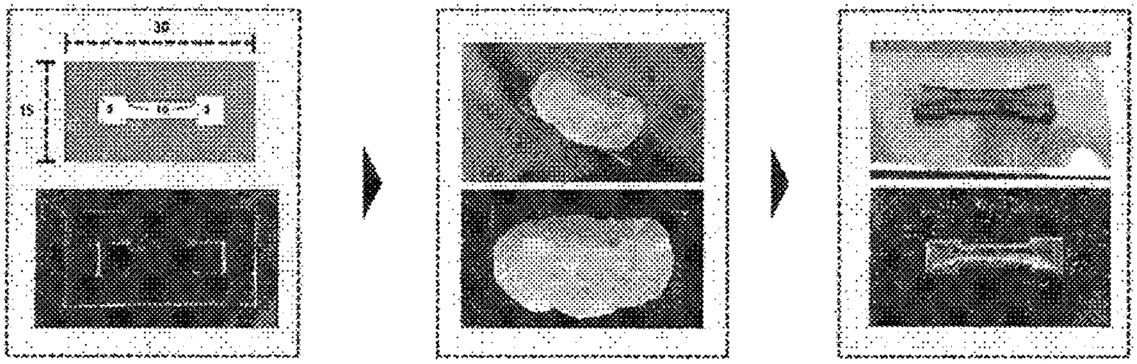
FIG. 16 shows a DNA resin composition produced in dogbone form.

DNA resin was produced as a specimen and the physical properties were confirmed by the True-Strain-Stress test method (refer to FIG. 16). Specifically, after fixing both ends of the DNA resin produced in the form of a dogbone, the force required when tension was performed was measured using the Mark-10 Force Gauge.

Figure 17A:
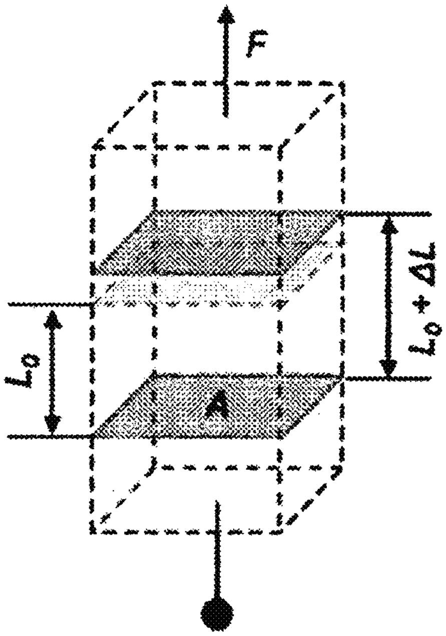
FIG. 17A is a schematic diagram of a true stress-strain test for a specimen produced in dogbone form.
Figure 17B:
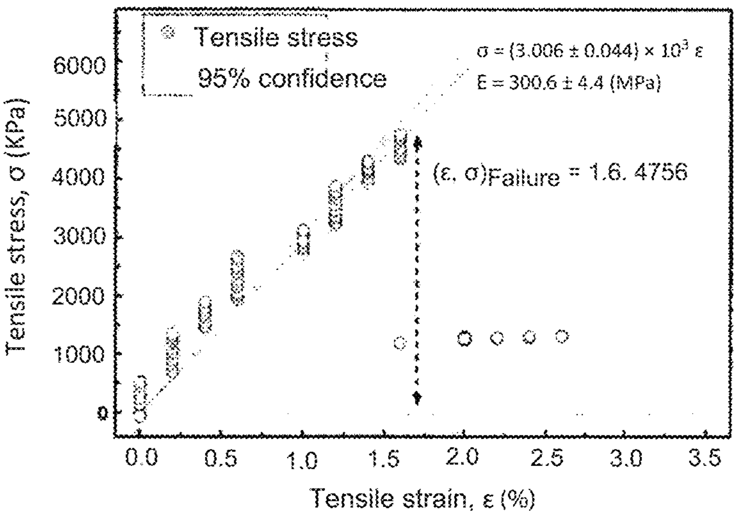
FIG. 17B shows the true stress-strain test result of a DNA resin composition produced in dogbone form.

The experimental result was converted into the conversion formula ($\sigma=F/A$, $\varepsilon=(L_0+{}^{\Delta}L)/L_0$) shown in FIG. 17A to calculate tensile strain (ε) compared to tensile stress (σ). According to FIG. 17B, the dried DNA resin had a very high as Young's modulus of about 0.3 GPa and a marginal strain of about 4.8 MPa, and it was confirmed that it had strength comparable to existing commercially available plastics.

INDUSTRIAL AVAILABILITY

The present disclosure relates to the DNA-based resin composition that is expected to be used as a biodegradable plastic material because it can be easily molded before drying and can have physical properties that can replace existing plastics after drying.

What is claimed is:

1. DNA resin composition comprising:

DNA as a polymer; and a bipyridine-based compound as a flocculant, wherein the DNA and the bipyridine-based compound are combined, and wherein the bipyridine-based compound is represented by the following Chemical Formula (1):

[Chemical Formula 1]

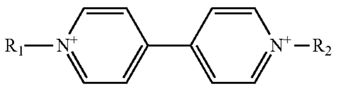

in Chemical Formula 1, R 1 and R 2 are straight chain or branched chain alkyl groups of C2 to C8, respectively.

2. The DNA resin composition of claim 1, wherein the molar ratio of the base pair of the DNA and the bipyridine-based compound is 1~3:1.5~3, and the number of moles of DNA is based on base pairs.

3. Bioink compositions for 3D printing, comprising DNA and bipyridine-based compounds, and wherein the bipyridine-based compound is represented by the following Chemical Formula (1):

[Chemical Formula 1]

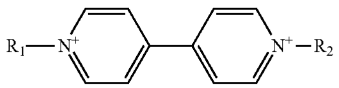

in Chemical Formula 1, R 1 and R 2 are straight chain or branched chain alkyl groups of C2 to C8, respectively.

* * * * *